US008219143B2

(12) United States Patent
Waku et al.

(10) Patent No.: US 8,219,143 B2
(45) **Date of Patent: *Jul. 10, 2012**

(54) MOBILE RADIO DEVICE

(75) Inventors: Kenji Waku, Kanagawa (JP); Tadeshi Koyama, Kanagawa (JP); Kunihiko Watanabe, Kanagawa (JP); Masato Harikae, Kanagawa (JP); Shin Takahashi, Kanagawa (JP); Daisuke Togashi, Kanagawa (JP); Yoshiaki Hiraoka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 328 days.

This patent is subject to a terminal disclaimer.

(21) Appl. No.: 12/443,456

(22) PCT Filed: Sep. 28, 2007

(86) PCT No.: PCT/JP2007/069081

§ 371 (c)(1),
(2), (4) Date: Dec. 16, 2009

(87) PCT Pub. No.: WO2008/041652

PCT Pub. Date: Apr. 10, 2008

(65) Prior Publication Data

US 2010/0093390 A1 Apr. 15, 2010

(30) Foreign Application Priority Data

Sep. 28, 2006 (JP) ................................ 2006-265215
Jan. 25, 2007 (JP) ................................ 2007-015537
Feb. 27, 2007 (JP) ................................ 2007-047209
Jun. 28, 2007 (JP) ................................ 2007-169905

(51) Int. Cl.
*H04M 1/00* (2006.01)

(52) U.S. Cl. ...... 455/552.1; 455/77; 455/78; 340/572.1; 343/702; 343/722

(58) Field of Classification Search .................... 455/77, 455/78, 552.1, 575.7; 343/702, 722, 876; 340/572.1

See application file for complete search history.

(56) References Cited

U.S. PATENT DOCUMENTS 6,958,730 B2 * 10/2005 Nagumo et al. .............. 343/702
7,228,112 B2 6/2007 Ota et al.

(Continued)

FOREIGN PATENT DOCUMENTS

JP 2001007629 A 1/2001

(Continued)

OTHER PUBLICATIONS

International Search Report for corresponding PCT application PCT/JP2007/069081 lists the references above.

(Continued)

*Primary Examiner* — Tuan H Nguyen
(74) *Attorney, Agent, or Firm* — DLA Piper LLP (US)

(57) ABSTRACT

A portable wireless device includes a first communication unit having a loop antenna that communicates with external devices using a first usable frequency band, and an RFID chip that performs predetermined processing with respect to information communicated by the loop antenna. A second communication unit includes a main antenna that communicates by a second usable frequency band that is higher than the first usable frequency band, and a communication processing unit that performs predetermined processing with respect to information communicated by the main antenna. A reactance component of the loop antenna is adjusted such that a high-order secondary resonance point of the first usable frequency band does not overlap the second usable frequency band.

10 Claims, 11 Drawing Sheets

U.S. PATENT DOCUMENTS

| | | | |
|---|---|---|---|
| 7,269,393 B2 | 9/2007 | Ota et al. | |
| 7,290,718 B2 | 11/2007 | Sekita | |
| 2003/0190896 A1 | 10/2003 | Ota et al. | |
| 2004/0113842 A1* | 6/2004 | du Toit et al. | 343/700 MS |
| 2004/0135729 A1* | 7/2004 | Talvitie et al. | 343/702 |
| 2005/0122211 A1 | 6/2005 | Yoshigi et al. | |
| 2006/0118625 A1 | 6/2006 | Sekita | |
| 2007/0013591 A1 | 1/2007 | Ota et al. | |

FOREIGN PATENT DOCUMENTS

| | | |
|---|---|---|
| JP | 2002032731 A | 1/2002 |
| JP | 2002314313 A | 10/2002 |
| JP | 2004056413 A | 2/2004 |
| JP | 2004227046 A | 8/2004 |
| JP | 2004343287 A | 12/2004 |
| JP | 2005165703 A | 6/2005 |
| JP | 2005236585 A | 9/2005 |
| JP | 2006165805 A | 6/2006 |
| JP | 2006211551 A | 8/2006 |
| KR | 1020050108694 A | 11/2005 |
| KR | 102006088304 A | 8/2006 |
| KR | 1020060088304 A | 8/2006 |
| WO | 02061675 A1 | 8/2002 |

OTHER PUBLICATIONS

Korean language office action dated Sep. 7, 2011 and its English language translation for corresponding Korean application 1020097006235.

Japanese language office action dated Dec. 13, 2011 and its English language translation issued in corresponding Japanese application 2008537521.

Korean language office action dated Apr. 26, 2012 and its English language translation issued in corresponding Korean application 1020097006235 cites the foreign patent document above.

* cited by examiner

FIG.6

| CONFIGURATION PATTERN | SIDE A | SIDE B | SIDE C | SIDE D |
|---|---|---|---|---|
| 1 | NOT ADHERED | NOT ADHERED | NOT ADHERED | ADHERED |
| 2 | NOT ADHERED | NOT ADHERED | ADHERED | NOT ADHERED |
| 3 | NOT ADHERED | NOT ADHERED | ADHERED | ADHERED |
| 4 | NOT ADHERED | ADHERED | NOT ADHERED | NOT ADHERED |
| 5 | NOT ADHERED | ADHERED | NOT ADHERED | ADHERED |
| 6 | NOT ADHERED | ADHERED | ADHERED | NOT ADHERED |
| 7 | NOT ADHERED | ADHERED | ADHERED | ADHERED |
| 8 | ADHERED | NOT ADHERED | NOT ADHERED | NOT ADHERED |
| 9 | ADHERED | NOT ADHERED | NOT ADHERED | ADHERED |
| 10 | ADHERED | NOT ADHERED | ADHERED | NOT ADHERED |
| 11 | ADHERED | NOT ADHERED | ADHERED | ADHERED |
| 12 | ADHERED | ADHERED | NOT ADHERED | NOT ADHERED |
| 13 | ADHERED | ADHERED | NOT ADHERED | ADHERED |
| 14 | ADHERED | ADHERED | ADHERED | NOT ADHERED |
| 15 | ADHERED | ADHERED | ADHERED | ADHERED |

MOBILE RADIO DEVICE

CROSS-REFERENCE TO THE RELATED APPLICATIONS

This application is a national stage of international application No. PCT/JP2007/069081 filed Sep. 28, 2007, which also claims the benefit of priority under 35 USC 119 to Japanese Patent Application No. 2006-265215 filed Sep. 28, 2006, Japanese Patent Application No. 2007-015537 filed Jan. 25, 2007, Japanese Patent Application No. 2007-047209 filed Feb. 27, 2007 and Japanese Patent Application No. 2007-169905 filed Jun. 28, 2007, the entire contents of which are incorporated herein by reference.

TECHNICAL FIELD

The present invention relates to a portable terminal device for communicating with other terminals.

BACKGROUND ART

Recently, for improved functionality, portable wireless devices provided with a first antenna built into a body thereof, for communicating with external devices by means of RFID (Radio Frequency Identification), which is a contactless IC (Integrated Circuit) chip, and the like, are becoming common (for example, see Patent Document 1).

In addition, portable wireless devices provided with a second antenna for communicating with a mobile communication network built into a body thereof, for more sophisticated design, are also becoming common, as shown in Patent Document 1.

[Patent Document 1] Japanese Unexamined Patent Application, First Publication No. 2004-227046

DISCLOSURE OF THE INVENTION

Problems to be Solved by the Invention

Although the first antenna and the second antenna use different usable frequency bands, the antennae are disposed as far as possible from each other in order to suppress interference effects. This makes efficient use of space inside the body difficult, thus preventing size reduction of the body.

Therefore, if gain degradation due to an adjacent arrangement of the antennae can be avoided, the space inside the body can be efficiently used and the body can be reduced in size.

The present invention has been made in view of the abovementioned problems, and one objective thereof is to provide a portable wireless device that allows for size reduction of a body thereof by effective use of space inside the body by suppressing gain degradation of a plurality of antennae having different frequency bands disposed adjacently in the body.

Means for Solving the Problems

In order to solve the abovementioned problems, a portable wireless device according to the present invention is characterized by including: a body; a first communication unit that includes a first antenna unit, which is disposed in the body and communicates with an external device by way of a first usable frequency band, and a first information processing unit that performs predetermined processing with respect to information communicated by the first antenna unit; and a second communication unit that includes a second antenna unit, which is disposed in the vicinity of the first antenna unit disposed in the body and communicates by way of a second usable frequency band that is higher than the first usable frequency band, and a second information processing unit that performs predetermined processing with respect to information communicated by the second antenna unit, in which the portable wireless device is configured such that a high-order secondary resonance point of the first usable frequency band does not overlap the second usable frequency band.

In addition, in the portable wireless device, the first antenna unit is preferably a magnetic field antenna, and the portable wireless device is configured such that the secondary resonance point does not overlap the second usable frequency band by adjusting a reactance component of the magnetic field antenna.

Furthermore, the portable wireless device is configured such that the reactance component of the magnetic field antenna is adjusted by adhering a dielectric material or a magnetic material on at least a portion of the magnetic field antenna, and the secondary resonance point preferably does not overlap the second usable frequency band.

Moreover, in the portable wireless device, the dielectric material is preferably composed of any one of: a resin, a sponge and a plastic, or a combination thereof.

In addition, in the portable wireless device, the first antenna unit is preferably a magnetic field antenna, and the portable wireless device is configured such that the secondary resonance point does not overlap the second usable frequency band by connecting a capacitor to the magnetic field antenna.

Furthermore, in the portable wireless device, the first antenna unit is preferably a plurality of magnetic field antennae, and the portable wireless device is configured such that the secondary resonance point does not overlap the second usable frequency band by connecting a capacitor to each of the magnetic field antennae.

Moreover, in the portable wireless device, the first antenna unit is preferably disposed so that at least a portion thereof faces the second antenna unit in a predetermined direction, and the capacitor is preferably connected to a portion, facing the second antenna unit, of the first antenna unit.

In addition, in the portable wireless device, the first communication unit is preferably a contactless IC (Integrated Circuit) chip that communicates with external devices using electromagnetic induction or electromagnetic coupling.

Furthermore, in order to solve the abovementioned problems, a portable wireless device according to the present invention is characterized by including: a body; a first communication unit that includes a first antenna unit disposed in the body that communicates with external devices by way of a first usable frequency band, and a first information processing unit that performs predetermined processing with respect to information communicated by the first antenna unit; and a second communication unit that includes a second antenna unit disposed in the body, in a position where the second antenna may cause interference to the first antenna unit, which communicates by way of a second usable frequency band that is higher than the first usable frequency band, and a second information processing unit that performs predetermined processing with respect to information communicated by the second antenna unit, in which a high-order secondary resonance point of the first usable frequency band generated due to resonance of the first antenna unit is adjusted not to overlap the second usable frequency band.

Moreover, the portable wireless device preferably includes: a third communication unit that includes a third antenna unit which is disposed in the vicinity of the first antenna unit, which communicates by way of a third usable frequency band that is higher than the first usable frequency band, and a third information processing unit which performs predetermined processing with respect to information communicated by the third antenna unit; and a control unit that controls any one of the second communication unit and the third communication unit, makes an adjustment so that a high-order secondary resonance point of the first usable frequency band does not overlap the second usable frequency band in a case where the control unit controls the second communication unit, and makes an adjustment so that the high-order secondary resonance point of the first usable frequency band does not overlap the third usable frequency band in a case where the control unit controls the third communication unit.

Effects of the Invention

According to the present invention, reducing the size of a body is realized by effective use of space inside the body by suppressing gain degradation of a plurality of antennae having different frequency bands disposed adjacently in the body.

BRIEF DESCRIPTION OF THE DRAWINGS

FIG. 6 is a diagram showing a configuration pattern where a dielectric material or a magnetic material is adhered on some of the sides of the loop antenna shown in FIG. 5;

PREFERRED MODE FOR CARRYING OUT THE INVENTION

First Embodiment

A description is provided hereinafter regarding a first embodiment of the present invention.

Figure 1:
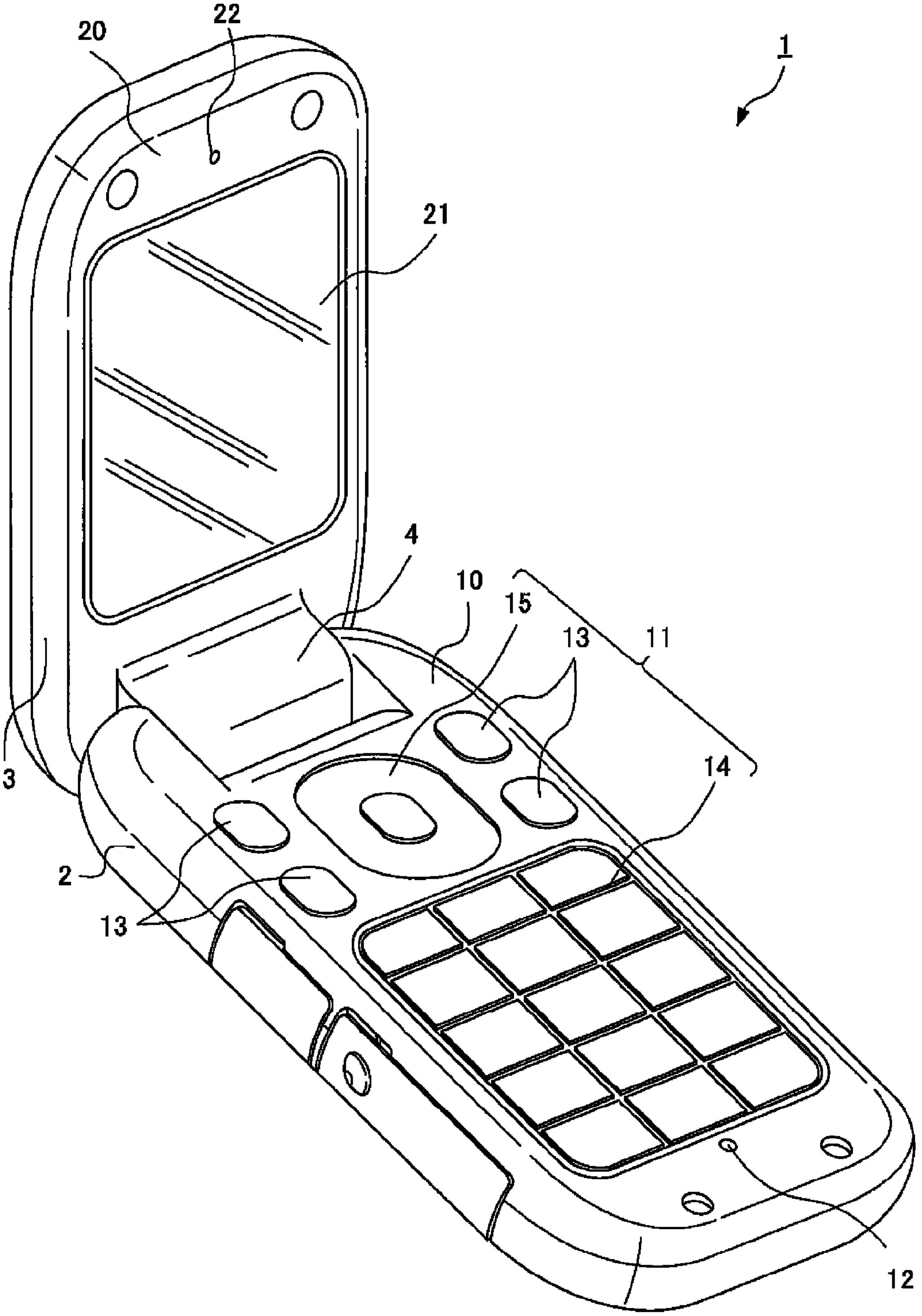
FIG. 1 is a perspective view showing an appearance of a cellular telephone device according to the present invention.

FIG. 1 is a perspective view showing an appearance of a cellular telephone device 1 as an example of the portable wireless device according to the present invention. It should be noted that, although FIG. 1 shows a so-called flip-type cellular telephone device, the present invention is not limited thereto.

The cellular telephone device 1 is configured to include an operation unit side body 2 and a display unit side body 3. The operation unit side body 2 is configured to include on a front face 10 thereof an operation button set 11 and a sound input unit 12 to which sounds, which a user of the cellular telephone device 1 produces during a phone call, are input. The operation button set 11 is composed of: feature setting operation buttons 13 for operating various settings and various features such as a telephone number directory feature and a mail feature; input operation buttons 14 for inputting digits of a telephone number and characters for mail, and a selection operation button 15 that performs selection of the various operations and scrolling.

The display unit side body 3 is configured to include, on a front face portion 20, a display 21 for displaying a variety of information, and a sound output unit 22 for outputting sound of the other party of the conversation.

In addition, the abovementioned operation button set 11, the sound input unit 12, the display 21, and the sound output unit 22 compose a processing unit 62 (described later).

An upper end portion of the operation unit side body 2 and a lower end portion of the display unit side body 3 are connected via a hinge mechanism 4. The cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
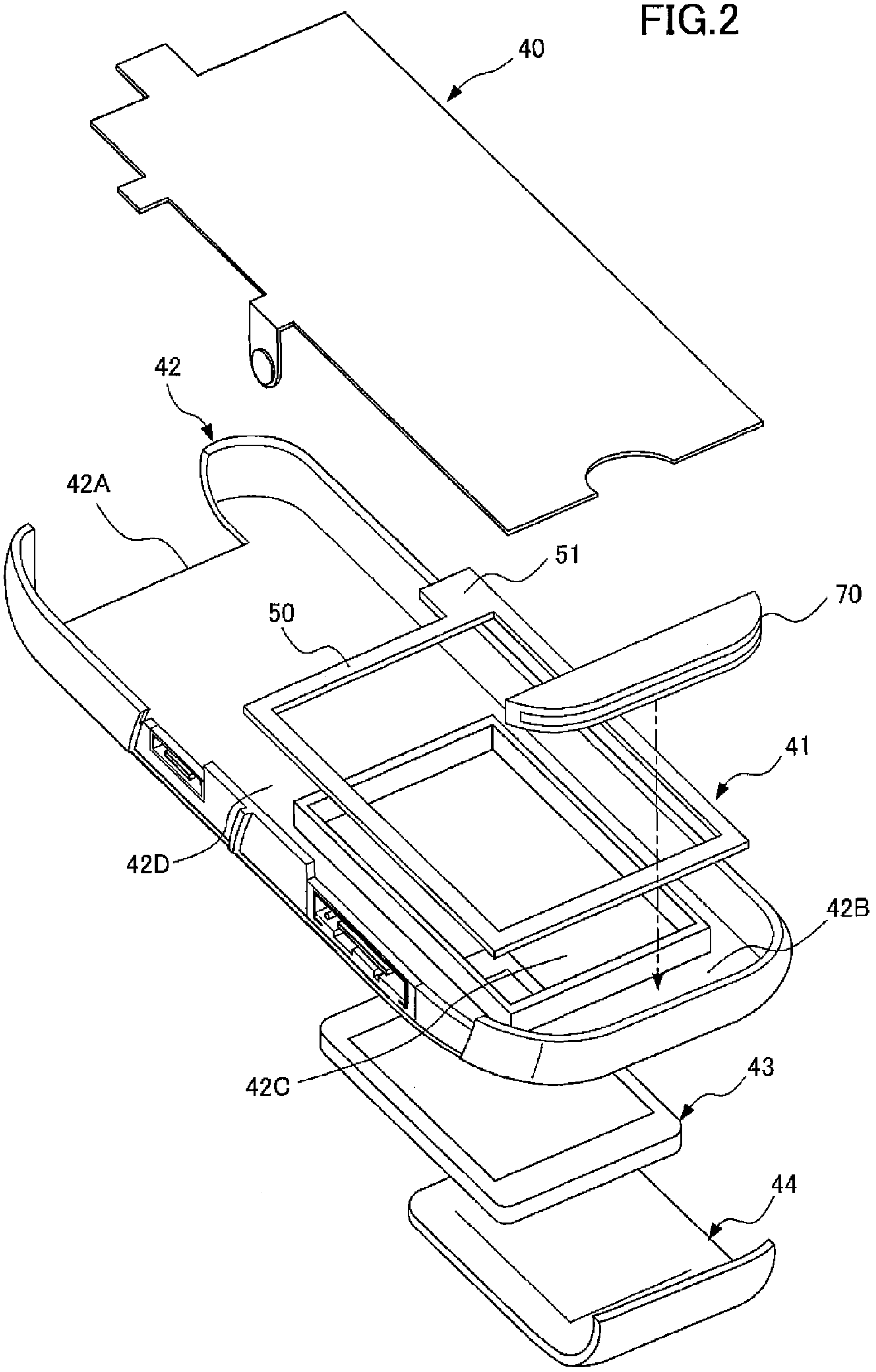
FIG. 2 is a perspective view showing a configuration of an operation unit side body included in a cellular telephone device according to the present invention.

FIG. 2 is an exploded perspective view of a part of the operating unit side body 2. The operating unit side body 2 is composed of a substrate 40, an RFID portion 41, a rear case portion 42, a rechargeable battery 43, and a battery cover 44, as shown in FIG. 2.

On the substrate 40, an element such as a CPU for performing predetermined arithmetic processing is mounted, and a predetermined signal is provided thereto when a user operates the operation button set 11 on the front face 10.

The RFID portion 41 is composed of a loop antenna 50 (the first antenna unit), which is an example of the magnetic field antenna for communicating with external devices by way of a first usable frequency band, and an RFID chip 51 (the first information processing unit) that performs predetermined processing with respect to information communicated by the loop antenna 50. The RFID portion 41 is later described in detail. The RFID chip 51 can also be provided on the substrate 40 or on a sub substrate (not shown). Furthermore, the RFID portion 41 can be configured with a magnetic field antenna other than the loop antenna.

The rear case portion 42 includes: a hinge mechanism fixing portion 42A for fixing the hinge mechanism 4; a main antenna housing portion 42B for housing a main antenna 70 (the second antenna unit), which communicates using the second usable frequency band that is higher than the first usable frequency band; a battery housing portion 42C for housing the rechargeable battery 43; and an RFID portion fixing portion 42D for fixing the RFID portion 41. The main antenna 70 is later described in detail.

Figure 3:
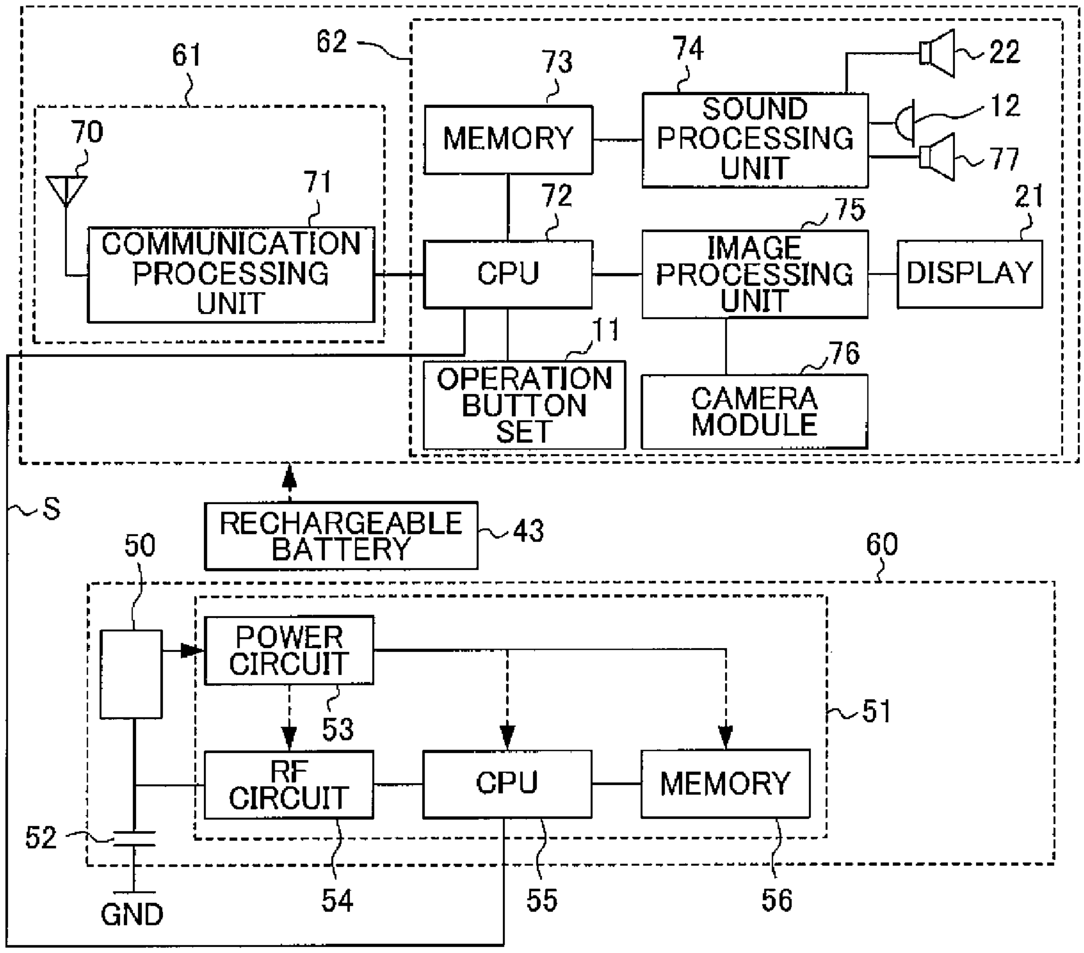
FIG. 3 is a block diagram showing features of the cellular telephone device according to the present invention.

FIG. 3 is a functional block diagram showing features of the cellular telephone device 1. As shown in FIG. 3, the cellular telephone device 1 includes: a first communication unit 60 composed of the RFID portion 41; a second communication unit 61 that communicates with external terminals;

and a processing unit 62 that processes information communicated by the second communication unit 61.

The first communication unit 60 is composed of the RFID portion 41 and includes the loop antenna 50 that communicates with external devices by way of the first usable frequency band (for example, 13.56 MHz), the RFID chip 51, and a capacitor 52 for adjustment.

The loop antenna 50 is configured to include a coil wound in a spiral for a plurality of times on a sheet made of PET (polyethylene terephthalate) material, and receives a signal of the first usable frequency band submitted by external devices.

The RFID chip 51 includes: a power circuit 53 that generates a predetermined voltage based on electrical power induced by a signal communicated by the loop antenna 50; an RF circuit 54 that performs signal processing such as modulation processing or demodulation processing with respect to a signal communicated by the loop antenna 50; a CPU 55 that performs predetermined arithmetic processing; and memory 56 that stores predetermined data. The power circuit 53 is composed of a DC-DC converter, for example.

Behavior of the first communication unit 60 is described hereinafter.

The loop antenna 50, when approaching within a predetermined distance to a reading/writing device disposed outside thereof, receives radio waves emitted from the reading/writing device (modulated by a carrier frequency having the first usable frequency band (for example, 13.56 MHz)). The capacitor 52 makes a predetermined adjustment (tuning) so that the radio waves of the first usable frequency band is supplied to the RF circuit 54 via the loop antenna 50.

In addition, electromotive force is generated by a resonance effect when the radio waves are received by the loop antenna 50.

The power circuit 53 generates a predetermined power supply voltage from the electromotive force generated by the resonance effect, and supplies thereof to the RF circuit 54, the CPU 55, and the memory 56. The RF circuit 54, the CPU 55, and the memory 56 are switched from a halting state into an active state when the predetermined power supply voltage is supplied from the power circuit 53.

The RF circuit 54 performs signal processing such as demodulation with respect to a signal of the first usable frequency band received via the loop antenna 50, and transmits the processed signal to the CPU 55.

The CPU 55 writes or reads data to or from the memory 56, based on the signal received from the RF circuit 54. In a case of reading data from the memory 56, the CPU 55 transmits the data to the RF circuit 54. The RF circuit 54 performs signal processing such as modulation with respect to the data being read from the memory 56, and transmits the data to the external reading/writing device via the loop antenna 50.

It should be noted that the first communication unit 60 is described above to be a so-called passive, induction field type (electromagnetic induction type) without a power source; however, the present invention is not limited thereto, and the first communication unit 60 can also be of passive mutual induction type (electromagnetic coupling type) or a passive radiation field type (radio wave type), or an active type with a power source. In addition, an access method of the first communication unit 60 is described as a read/write type; however, the present invention is not limited thereto, and the access method can also be read-only type, write-once type, and the like.

As shown in FIG. 3, the second communication unit 61 includes: a main antenna 70 that communicates with external devices by way of the second usable frequency band that is higher than the first usable frequency band; and a communication processing unit 71 (the second information processing unit) that performs signal processing such as modulation processing or demodulation processing. In addition, the second communication unit 61 is powered by the rechargeable battery 43.

The main antenna 70 communicates with external devices by way of the second usable frequency band (for example, 800 MHz). It should be noted that, although the second usable frequency band is described as 800 MHz in the present embodiment, other frequency bands can also be used. In addition, the main antenna 70 can be configured as a so-called dual band compatible antenna that can accept, in addition to the second usable frequency band, a third usable frequency band (for example, 2 GHz), or as a multi-band compatible antenna that can further accept a fourth usable frequency band.

The communication processing unit 71 performs demodulation processing of a signal received by the main antenna 70, transmits the processed signal to the processing unit 62, performs modulation processing of a signal received from the processing unit 62, and submits the processed signal to an external device via the main antenna 70.

As shown in FIG. 3, the processing unit 62 includes: the operation button set 11; the sound input unit 12; the display 21; the sound output unit 22; the CPU 72 that performs predetermined arithmetic processing; the memory 73 that stores predetermined data; a sound processing unit 74 that performs predetermined sound processing; an image processing unit 75 that performs predetermined image processing; a camera module 76 that captures an image of an object; and a speaker 77 that outputs ringtones and the like. In addition, the processing unit 62 is powered by the rechargeable battery 43. As shown in FIG. 3, it should be noted that, the cellular telephone device 1 is configured such that: the CPU 55 and the CPU 72 are connected by a signal line S via which information processed by the first communication unit 60 is transmitted to the image processing unit 75; and information processed by the image processing unit 75 is displayed on the display 21.

Figure 4:
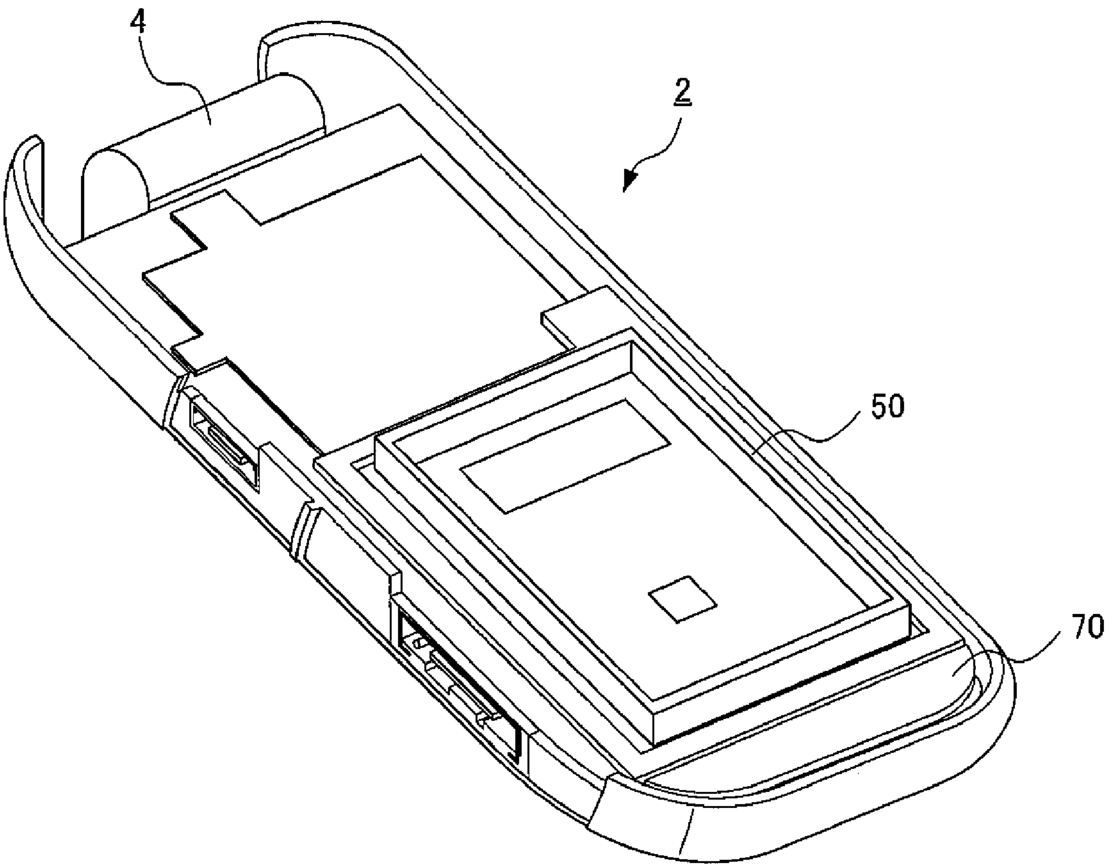
FIG. 4 is a perspective view showing a positional relationship between a loop antenna and a main antenna provided in the cellular telephone device according to the present invention.

FIG. 4 is a diagram showing a positional relationship between the loop antenna 50 and the main antenna 70 in the RFID portion 41. The rear case portion 42 is omitted in FIG. 4.

As shown in FIG. 4, the loop antenna 50 and the main antenna 70 are in the vicinity of each other (by several millimeters). In a case where two antennae are disposed in the vicinity of each other in this manner, problems occur due to interference.

More specifically, the loop antenna 50 has low-order and high-order secondary resonance points cyclically, other than the usable frequency band (13.56 MHz). Especially, when the high-order secondary resonance point (hereinafter referred to as high-order resonance point) overlaps the usable frequency band of the main antenna 70 (800 MHz), gain of the main antenna 70 is degraded.

Given this, the cellular telephone device 1 according to the present invention is configured such that the high-order resonance point of the loop antenna 50 does not overlap the usable frequency band of the main antenna 70, by adhering a dielectric material or a magnetic material onto at least a portion of the loop antenna 50, or by changing the number of turns of the coil in the loop antenna 50, in order to prevent interference to the main antenna 70 by a high-order resonance point of the loop antenna 50, thereby avoiding gain degradation of the main antenna 70.

The RFID portion 41 adjusts a resonance (tuning) frequency to 13.56 MHz based on a reactance value (L) of the loop antenna 50 and the reactance value (C) of the capacitor 52. Here, the value L is determined by a size of the loop antenna 50, the number of turns of the coil, existence or nonexistence of material (a dielectric material or a magnetic material) provided therearound, or a distance from metal disposed in the vicinity thereof. In addition, the value L of the loop antenna 50 is dominant with respect to the high-order resonance point. Therefore, the location of the high-order resonance point can be adjusted by changing the value L. It should be noted that the value C of the capacitor 52 does not affect the high-order resonance point.

As described above, the cellular telephone device 1 is configured such that: the high-order resonance point of the loop antenna 50 does not overlap the main antenna 70, by adjusting the value L of the loop antenna 50 by adhering a dielectric material or a magnetic material onto at least a portion of the loop antenna 50, or by changing the number of turns of the coil in the loop antenna 50; and the high-order resonance point of the loop antenna 50 is out of the usable frequency band of the main antenna 70 while maintaining the usable frequency band (13.56 MHz), since the resonance frequency is set to 13.56 MHz by adjusting the value C of the capacitor 52.

An example of the dielectric material to be adhered onto at least a portion of the loop antenna 50 includes: plastic such as a PET material; a sponge; and a resin. The abovementioned materials, which are relatively inexpensive and light-weight, can suppress adding weight to the cellular telephone device 1 as much as possible.

Figure 5:
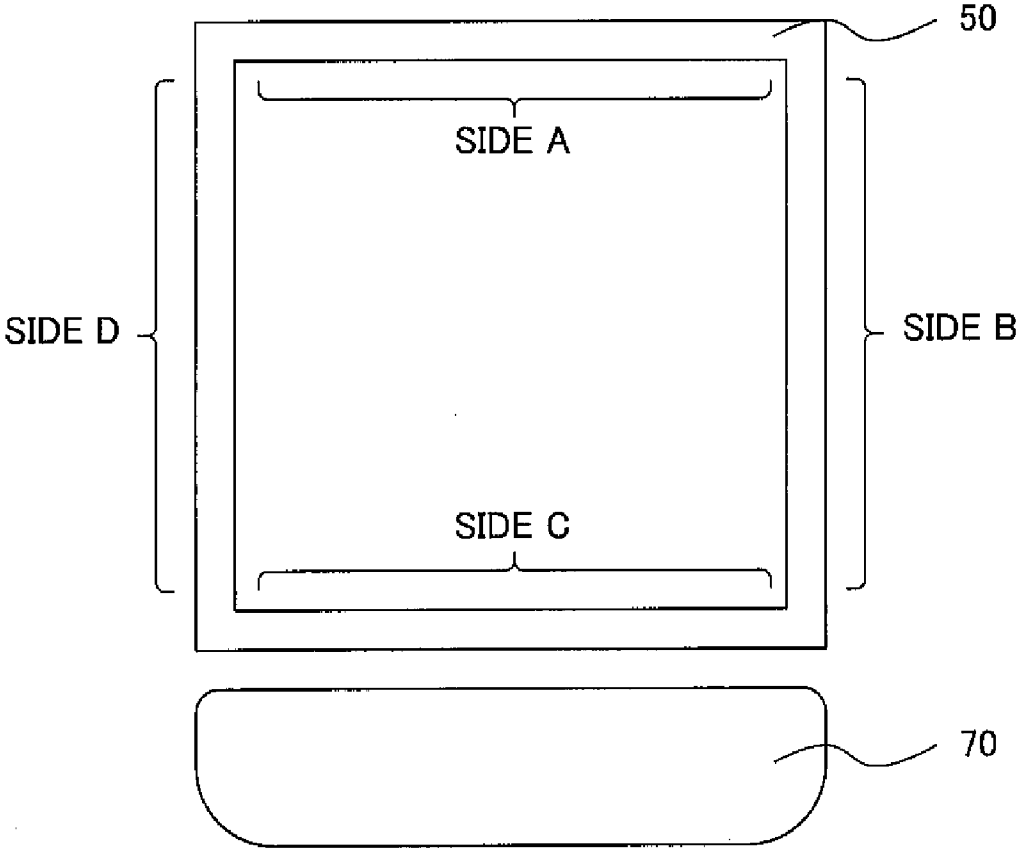
FIG. 5 is a schematic view showing each side of the loop antenna provided in the cellular telephone device according to the present invention.

Here, diagrams of configuration pattern, where a dielectric material or a magnetic material is adhered onto at least a portion of the loop antenna, are shown in FIGS. 5 and 6. FIG. 5 is a schematic view showing four sides of the loop antenna 50 as a side a, a side b, a side c, and a side d; and FIG. 6 is a diagram showing a configuration pattern where a dielectric material or a magnetic material is adhered on some of the sides a to d shown in FIG. 5.

As shown in FIG. 6, there are 15 configuration patterns where a dielectric material or a magnetic material is adhered on the side a, side b, side c, and side d of the loop antenna 50.

Figure 7:
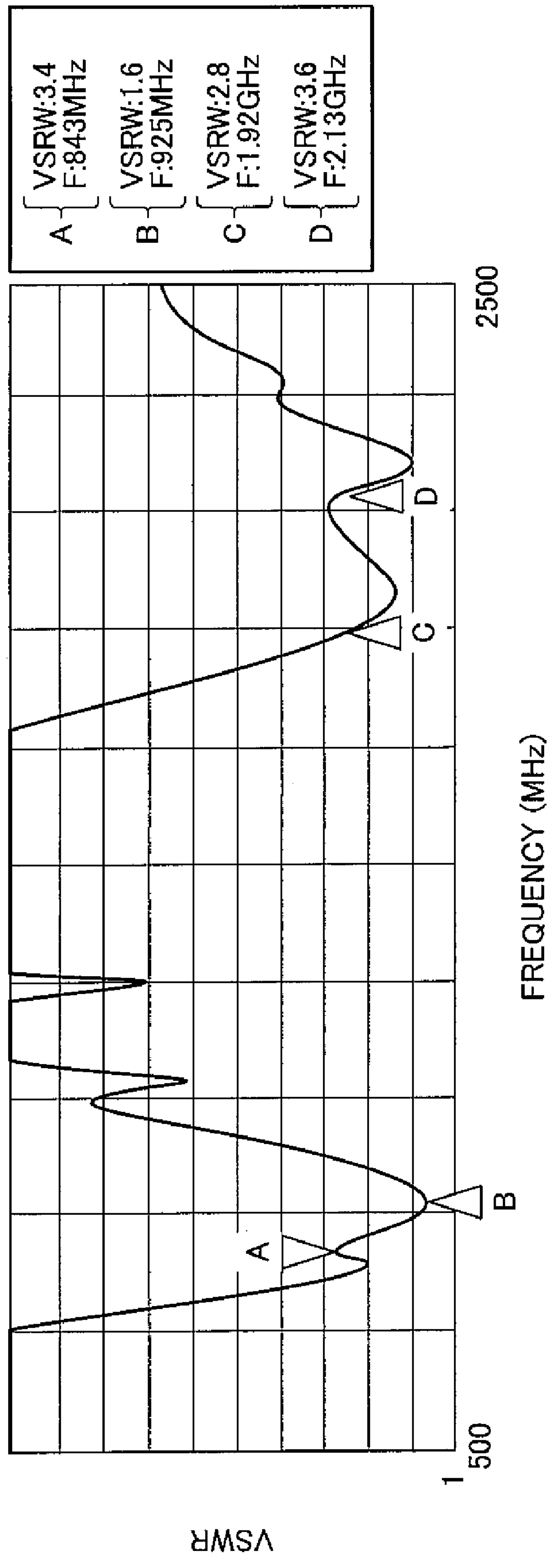
FIG. 7 is a diagram showing a VSWR result in a case where a dielectric material is adhered on an entirety of the loop antenna.
Figure 8:
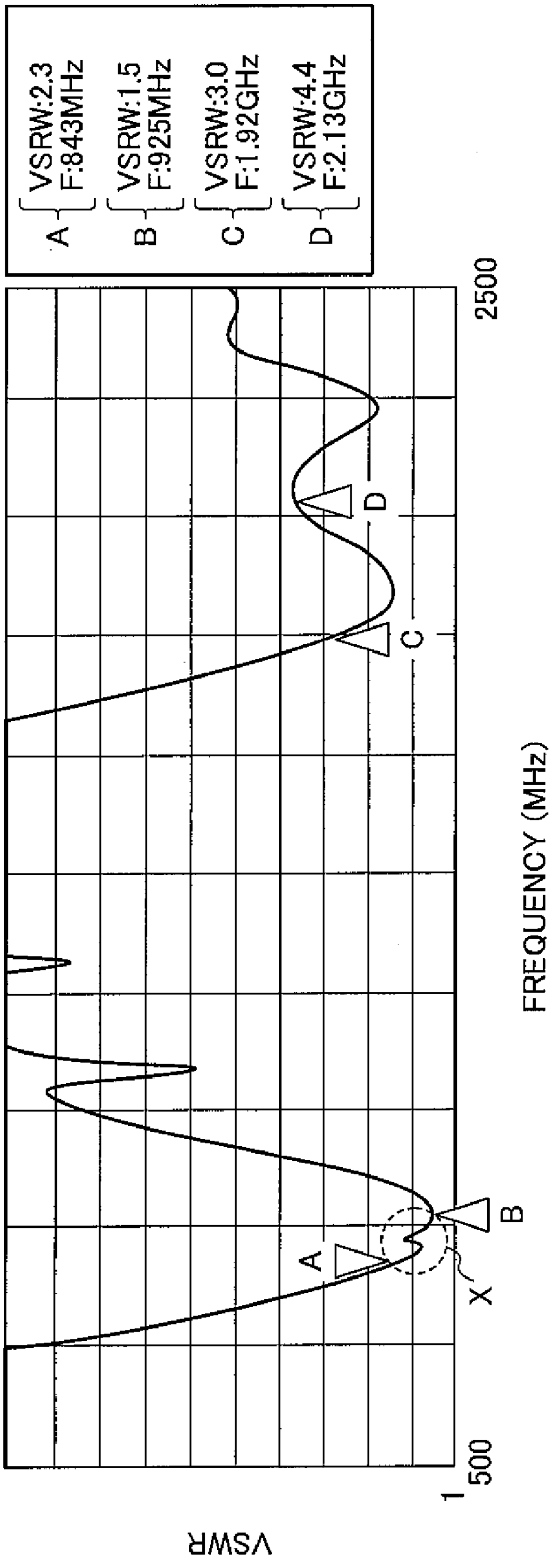
FIG. 8 is a diagram showing a VSWR result in a case where a dielectric material is not adhered on the loop antenna.

FIG. 7 shows a VSWR (Voltage Standing Wave Ratio) result obtained with frequencies of 500 MHz to 2.5 GHz in a case where a dielectric material is adhered on an entirety of the loop antenna 50 in the configuration pattern 15 in FIG. 6; and FIG. 8 shows a VSWR result obtained with frequencies of 500 MHz to 2.5 GHz in a case where a dielectric material is not adhered on the loop antenna 50. A measurement was carried out by connecting a measurement device (a network analyzer) to a feeding point of the main antenna 70 of the cellular telephone device 1. For the measurement, cellular telephone devices of a usable frequency bandwidth of 843 to 925 MHz (point A to point B in FIGS. 7 and 8) and of a usable frequency bandwidth of 1.92 to 2.18 GHz (point C to point D in FIGS. 7 and 8) were used.

As shown in FIGS. 7 and 8, in a case where a dielectric material is not adhered on the loop antenna 50 (FIG. 8), an effect of the high-order resonance point of the loop antenna 50 (X in FIG. 8) can be observed in the range of 843 to 925 MHz (point A to point B in FIG. 8); however, in a case where a dielectric material is adhered on an entirety of the loop antenna 50 (FIG. 7), an effect of the high-order resonance point of the loop antenna 50 cannot be observed in the range of 843 to 925 MHz (point A to point B in FIG. 7).

Therefore, in the cellular telephone device 1, the value L of the loop antenna 50 can be changed and the position of the high-order resonance point of the loop antenna 50 can be shifted by adhering a dielectric material or a magnetic material on at least a portion of the loop antenna 50, thereby avoiding interference to and gain degradation of the main antenna 70. In addition, with the cellular telephone device 1, the space inside the body can be efficiently used while maintaining a sophisticated design, and the body can be reduced in size.

In addition, the cellular telephone device 1 can be configured such that the number of turns of the coil is changed, since the value L of the loop antenna 50 can thus be changed, as described above. In the cellular telephone device 1, the value L of the loop antenna 50 can be changed and the position of the high-order resonance point of the loop antenna 50 can be shifted by changing the number of turns of the coil, thereby avoiding interference to and gain degradation of the main antenna 70.

With a loop antenna 50 such as that of the present embodiment, which communicates by electromagnetic induction, in a case where metal (for example, the rechargeable battery 43) is disposed in the vicinity thereof, magnetic field lines may enter the metal at the moment of communication and generate current (eddy current) on a surface of the metal, thereby generating magnetic field lines in an opposite direction. The magnetic field lines in an opposite direction may degrade the gain of the loop antenna 50; however, the magnetic field lines and gain degradation can be appropriately reduced, as in the present embodiment, by adhering a dielectric material or a magnetic material on at least a portion of the loop antenna 50.

In addition, in the cellular telephone device 1, the loop antenna 50 itself can be reduced in size by appropriately reducing gain degradation thereof, and therefore the loop antenna 50 and the main antenna 70 can be appropriately spaced apart from each other, thereby reducing the interference from each other.

It should be noted that, in the abovementioned embodiment, interference due to the main antenna 70 and the loop antenna 50 being disposed in the vicinity of each other has been described; however, the present invention is also applicable for interference not caused by a positional relationship between antennae.

In addition, in the abovementioned embodiment, the RFID was shown as a component communicating with external devices by way of the first usable frequency band; however, the present invention is not limited thereto and any other component, which may interfere with the usable frequency band of the main antenna 70, can be used.

Furthermore, in the abovementioned embodiment, the cellular telephone device 1 is configured such that the high-order secondary resonance point of the loop antenna 50 is adjusted by adhering a dielectric material or a magnetic material on at least a portion of the loop antenna 50 or changing the number of turns of the coil in the loop antenna 50; however, the present invention is not limited thereto and the high-order secondary resonance point of the loop antenna 50 can be adjusted also by, for example, blending magnetic powder with high relative magnetic permeability (ferrite powder) into the battery cover 44 and the operating unit side body 2 that are formed in the vicinity of the loop antenna 50. Thus, in the cellular telephone device 1, a magnetic material can be made spatially adjacent to the main antenna 70, thereby appropriately avoiding gain degradation of the main antenna 70. In addition, the cellular telephone device 1 can be more easily assembled and more freely designed, since a dielectric material and a magnetic material are not required to be adhered on at least a portion of the loop antenna 50.

Moreover, a magnetic material also has an effect of focusing magnetic field lines with respect to the main antenna 70. Therefore, in the cellular telephone device 1, a decrease in receiver sensitivity of antennae can be effectively suppressed by blending magnetic material into the battery cover 44 and the operating unit side body 2 that are formed in the vicinity of the loop antenna 50.

Furthermore, in the cellular telephone device 1, magnetic field lines in an opposite direction generated by metal disposed in the vicinity of the loop antenna 50 can be appropriately reduced by blending magnetic powder into the battery cover 44 and the operating unit side body 2 that are formed in the vicinity of the loop antenna 50.

Second Embodiment

A description is provided hereinafter regarding a second embodiment of the present invention.

Figure 9:
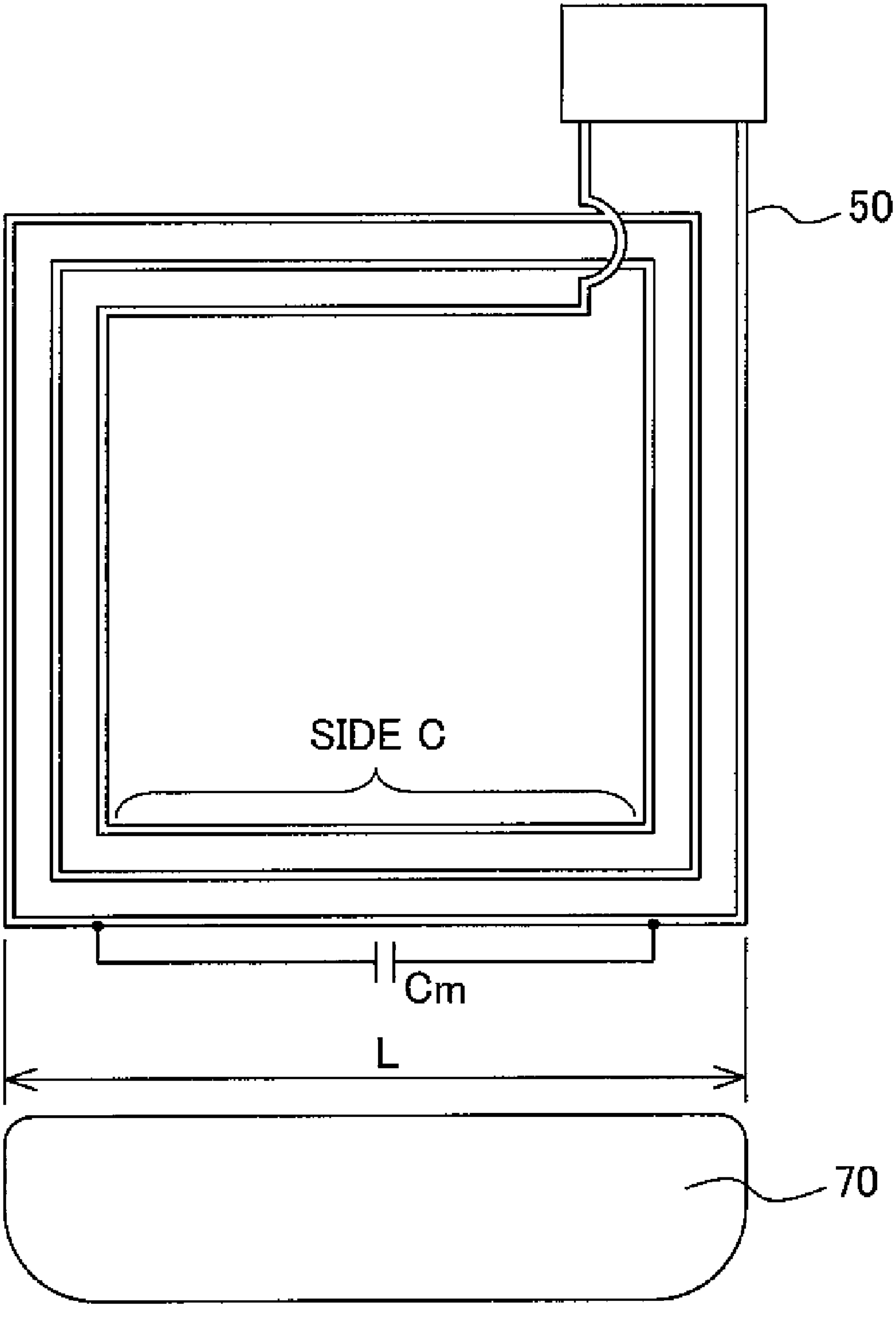
FIG. 9 is a schematic view of the loop antenna with a detuning capacitor when loaded.

Depending on a usable frequency of the main antenna 70, a length of the main antenna 70 (L in FIG. 9, for example a length corresponding to a quarter of a wavelength (λ/4)) may be substantially equal to a length of a side formed by an antenna pattern of the loop antenna 50. In such a case, if the main antenna 70 and the loop antenna 50 are disposed in the vicinity of each other, a side of the loop antenna 50 may be considered to be a virtual ground of the main antenna 70 and may affect the gain of the main antenna 70.

Given this, in the cellular telephone device 1, as shown in FIG. 9, a pattern for loading of detuning (offset) capacitance (detuning capacitor Cm) is provided to one of the sides in an antenna pattern of the loop antenna 50 (side c in the drawing), which is closest to (facing) the main antenna 70, and detunes the high-order secondary resonance point by adjusting a reactance value (C) thereof, thereby adjusting antenna characteristics of the main antenna 70.

According to such a configuration, in the cellular telephone device 1, an LC resonance circuit formed of the detuning capacitor Cm and the side of the loop antenna 50 becomes high in impedance around a usable frequency of the main antenna 70, thereby blocking current. Therefore, in the cellular telephone device 1, a side of the loop antenna 50 is not considered to be a virtual ground of the main antenna 70 in a case where the main antenna 70 receives the usable frequency, and the antenna characteristics of the main antenna 70 are not degraded. It should be noted that the reactance value of the detuning capacitor Cm is intended to be sufficiently small compared to the capacitor 52 (Cf).

Next, the effect of loading of the detuning capacitor Cm is hereinafter considered.

The loop antenna 50 is tuned to a predetermined resonant frequency (for example, 13.56 MHz) by adjusting a frequency by the value L (determined by a size of the loop antenna 50, the number of turns of the coil, existence or nonexistence of a dielectric material or a magnetic material, or a distance from metal disposed in the vicinity thereof) and the reactance value (C) of the capacitor 52 for adjustment, disposed on a substrate. As described above, since the detuning capacitor Cm is sufficiently small compared to a tuning capacitance of the loop antenna 50 (Cf>>Cm), the resonant frequency of the loop antenna 50 is not affected thereby.

In addition, as described above, the value L of the loop antenna 50 is dominant in the high-order resonance point of the loop antenna 50 (the usable frequency band of the main antenna 70). Therefore, the high-order resonance point can be shifted by changing the value L. As a result, the reactance value (C) of the capacitor does not work on the high-order resonance point, and thus there is no effect of loading the detuning capacitor Cm.

In this way, the cellular telephone device 1 can appropriately maintain antenna characteristics of the main antenna 70 by loading the detuning capacitor Cm, while appropriately maintaining antenna characteristics of the loop antenna 50 by eliminating the effects of the detuning capacitor Cm.

It should be noted that, in the above description, the detuning capacitor Cm is provided to a side (the side c in the drawing) of the antenna pattern of the loop antenna 50 that is closest to the main antenna 70; however, the present invention is not limited thereto, and the detuning capacitor Cm can be provided to every side.

It should also be noted that, in the above description, a single detuning capacitor Cm is configured to be connected to a side of the antenna pattern of the loop antenna 50; however, the present invention is not limited thereto, and a single detuning capacitor Cm can be configured to be connected to a plurality of loop antennae.

For example, a portable wireless device can be configured by disposing a passive loop antenna and an active loop antenna in the body, along with the main antenna 70, in order to provide a card function and a reading/writing function. In this way, even in a case where a plurality of antennae are disposed in the body along with the main antenna 70, in the cellular telephone device 1, a single detuning capacitor Cm connected to both of the antennae can detune a high-order resonance point of each of the antennae from the usable frequency band of the main antenna, thereby appropriately suppressing degradation of the antenna characteristics of the main antenna 70.

Figure 10:
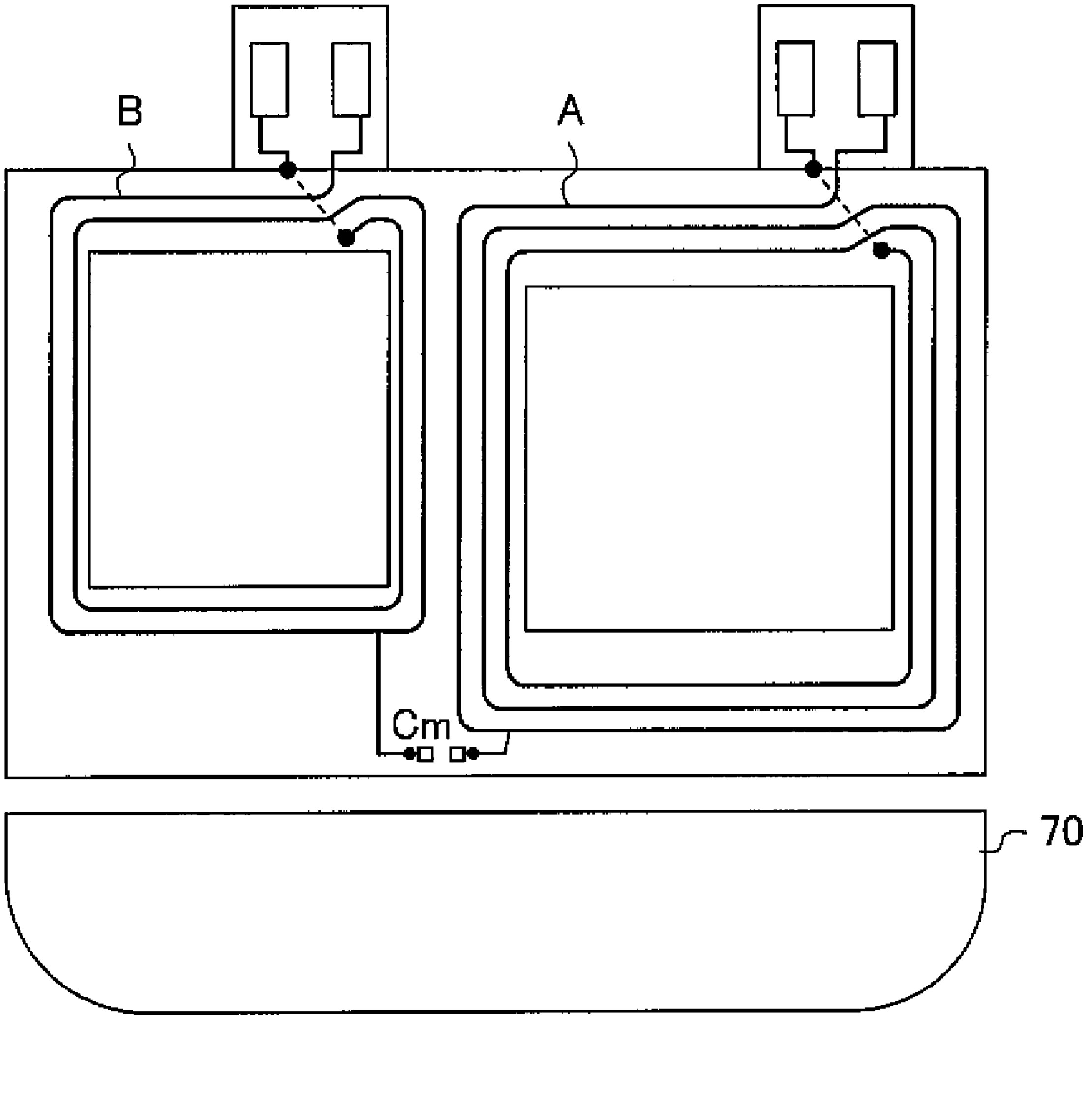
FIG. 10 is a schematic view of a plurality of loop antennae with detuning capacitors when loaded.

FIG. 10 is a diagram showing a configuration example of the cellular telephone device 1. FIG. 10 shows a configuration in which a passive loop antenna A and an active loop antenna B are disposed along with the main antenna 70 in the body, and both thereof are connected to a single detuning capacitor Cm. In such a case where the passive loop antenna A and the active loop antenna B are disposed in the vicinity of the main antenna 70 in the body, a high-order resonance point of each of the passive loop antenna A and the active loop antenna B may interfere with a usable frequency band of the main antenna 70. However, in the cellular telephone device 1, a single detuning capacitor Cm connected to both of the passive loop antenna A and the active loop antenna B can detune a high-order resonance point of each of the passive loop antenna A and the active loop antenna B from the usable frequency band of the main antenna, thereby appropriately suppressing degradation of the antenna characteristics of the main antenna 70.

In addition, the cellular telephone device 1 can adjust high resonance points of the plurality of antennae collectively by the single detuning capacitor Cm, and does not require a separate means for adjusting the high-order resonance point for each antenna. An efficient use of space inside the body, reduction in a number of components, size reduction of the whole body, and the like are thus realized. It should be noted that the plurality of antennae are not limited to the two loop antennae, and can be composed of antennae of other types and in larger number.

Third Embodiment

Next, a description is provided regarding a third embodiment of the present invention.

Conventionally, a portable wireless device including a so-called multi-band antenna, which can communicate with external devices by way of a plurality of usable frequency bands, are known. In such a portable wireless device, if the multi-band antenna is disposed in the vicinity of another antenna, a high-order secondary resonance point of the other antenna interferes with a part or all of a plurality of usable frequency bands of the multi-band antenna and may degrade the gain of the multi-band antenna.

The invention according to the third embodiment adjusts a high-order resonance point of the other antenna in accordance with the usable frequency bands in which the multi-band antenna communicates, and can suppress gain degradation of the multi-band antenna.

Figure 11:
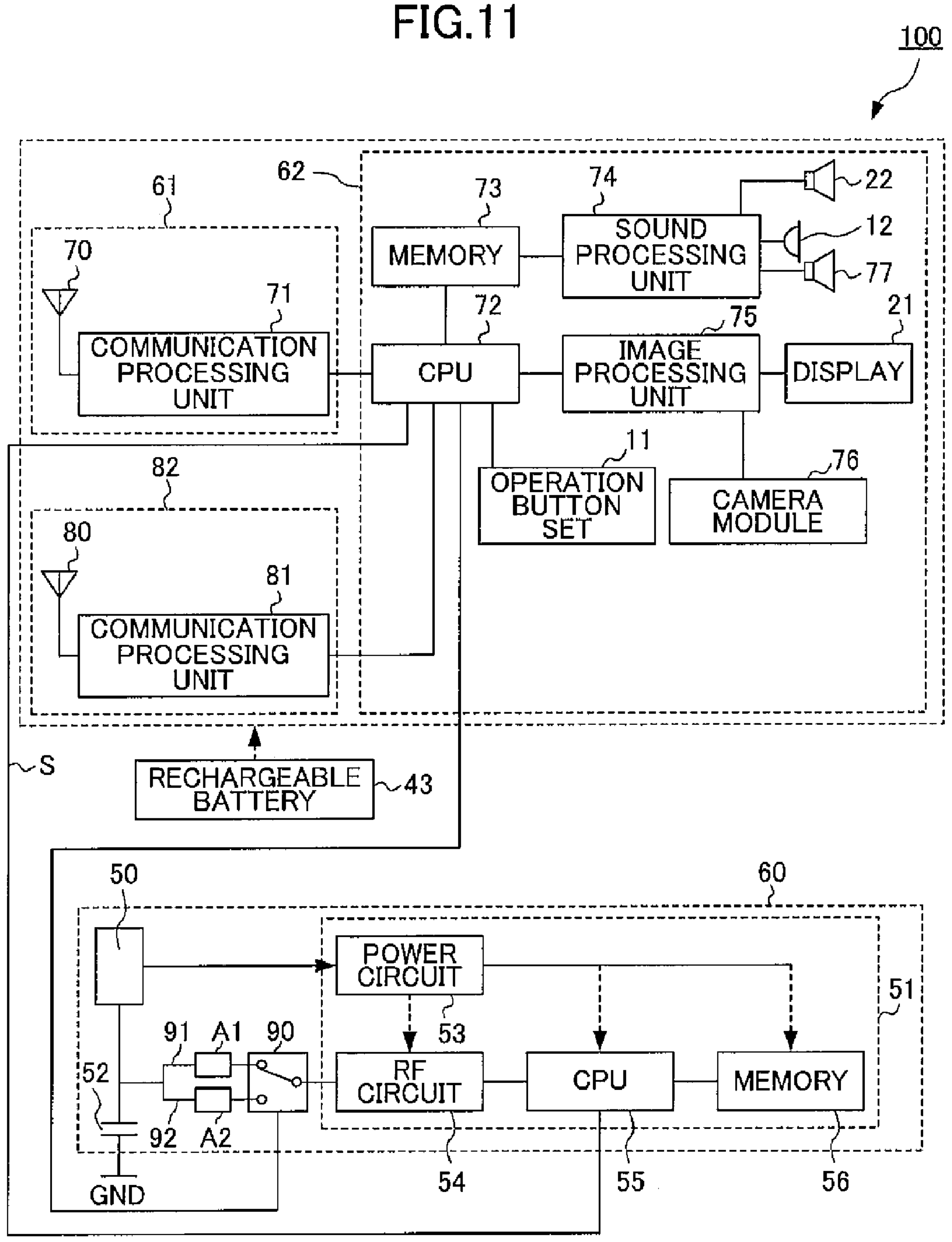
FIG. 11 is a block diagram showing features of the cellular telephone device according to the present invention.

FIG. 11 is a block diagram of a cellular telephone device 100 (portable wireless device) including a multi-band antenna. The cellular telephone device 100 is configured, as shown in FIG. 11, to include: a main antenna 70 (first antenna unit) that communicates with external devices by a usable frequency band of 800 MHz; a communication processing unit 71 that performs predetermined processing with respect to information communicated by the main antenna 70; a second main antenna 80 (third antenna unit) that communicates with external devices by a usable frequency band of 2 GHz (third usable frequency band); and a communication processing unit 81 (third communication processing unit) that performs predetermined processing with respect to information communicated by the second main antenna 80. The communication processing unit 71 and the communication processing unit 81 are each connected to a CPU 72 (control unit), which is configured to be able to control any one of the communication processing unit 71 and the communication processing unit 81. The second main antenna 80 and the communication processing unit 81 compose a third communication unit 82.

In addition, the cellular telephone device 100 includes a loop antenna 50 disposed in the vicinity of the main antenna 70 and the second main antenna 80. The loop antenna 50 is configured to be able to communicate with external devices by way of a usable frequency band lower than that of the main antenna 70 and of the second main antenna 80, and to be connected to the RF circuit 54 via an antenna switching unit 90. The antenna switching unit 90 is connected to the CPU 72. In addition, the CPU 72 transmits a control signal to the antenna switching unit 90, indicating which of the communication processing unit 71 and the communication processing unit 81 is presently controlled. In other words, the CPU 72 transmits to the antenna switching unit 90: in a case where the second communication unit 61 is communicating, a control signal indicating that the communication processing unit 71 is controlled; and in a case where the third communication unit 82 is communicating, a control signal indicating that the communication processing unit 81 is controlled. In accordance with a control signal transmitted from the CPU 72, the antenna switching unit 90 selectively switches between a first channel 91 and a second channel 92 that connects the loop antenna 50 and the RF circuit 54.

In the first channel 91, a detuning means A1 is provided for detuning a high-order secondary resonance point of the loop antenna 50 from a band of 800 MHz that is a usable frequency band of the main antenna 70, and in the second channel 92, a detuning means A2 is disposed for detuning a high-order secondary resonance point of the loop antenna 50 from a band of 2 GHz that is a usable frequency band of the second main antenna 80. An example of the detuning means A1 and A2 includes: a dielectric material, a magnetic material, a detuning capacitor and the like, which are configured to be able to change the value L of the loop antenna 50; and an electrical conductor and the like that can change the number of turns of the loop antenna 50. Other configurations of the cellular telephone device 100 are similar to that of the cellular telephone device 1 shown in the first and the second embodiments, and therefore a description thereof is omitted.

According to the abovementioned configuration, the cellular telephone device 100 can adjust a high-order secondary resonance point of the loop antenna in accordance with the usable frequency band in which the communication processing unit 71 or the communication processing unit 81 communicates. In other words, the CPU 72 transmits to the antenna switching unit 90: in a case where the communication processing unit 71 is communicating with external devices by way of the usable frequency band of 800 MHz, a control signal indicating thereof; and in a case where the communication processing unit 81 is communicating, a control signal indicating thereof.

Thereafter, the antenna switching unit 90: connects the loop antenna 50 to the RF circuit 54 with the first channel 91 in a case where the control signal being transmitted is related to a communication by the communication processing unit 71; and connects the loop antenna 50 to the RF circuit 54 with the second channel 92 in a case where the control signal being transmitted is related to a communication by the communication processing unit 81. Accordingly, in the cellular telephone unit 100, in a case where the communication processing unit 71 is communicating with external devices by way of the usable frequency band of 800 MHz, the loop antenna 50 and the RF circuit 54 is connected with the first channel 91, and the detuning means A1 detunes the high-order secondary resonance point of the loop antenna 50 from the band of 800 MHz. The cellular telephone device 100 can thus reduce gain degradation of the main antenna 70 appropriately.

On the other hand, in a case where the communication processing unit 81 is communicating with external devices by way of the usable frequency band of 2 GHz, the loop antenna 50 and the RF circuit 54 are connected with the second channel 92, and the detuning means A2 detunes the high-order secondary resonance point of the loop antenna 50 from the band of 2 GHz. The cellular telephone device 100 can thus reduce gain degradation of the second main antenna 80 appropriately.

It should be noted that, in the third embodiment, the main antenna 70 and the second main antenna 80, as multi-band antennae, are described as separate independent antennae; however, the present invention is not limited thereto, and the multi-band antennae can be a conventionally known, single antenna that can communicate with external devices in a plurality of usable frequency bands by way of an oscillating circuit and the like. It should be noted that, in such a case, the antenna is intended to be connected, via a single communication processing unit that performs predetermined processing with respect to information communicated in a plurality of frequency bands, to the CPU 72 that controls the single communication processing unit.

The invention claimed is:

1. A portable wireless device comprising:

a body;

a first communication unit that includes a first antenna unit, which is disposed in the body and communicates with an external device by way of a first usable frequency band, and a first information processing unit that performs predetermined processing with respect to information communicated by the first antenna unit; and a second communication unit that includes a second antenna unit, which is disposed in the vicinity of the first antenna unit disposed in the body and communicates by way of a second usable frequency band that is higher than the first usable frequency band, and a second information processing unit that performs predetermined processing with respect to information communicated by the second antenna unit, wherein the portable wireless device is configured such that a high-order secondary resonance point of the first usable frequency band does not overlap the second usable frequency band by adjusting a reactance component of the first antenna unit.

2. The portable wireless device according to claim 1, wherein:

the first antenna unit is a magnetic field antenna, and the portable wireless device is configured such that the secondary resonance point does not overlap the second usable frequency band by adjusting a reactance component of the magnetic field antenna.

3. The portable wireless device according to claim 2, configured such that the reactance component of the magnetic field antenna is adjusted by adhering a dielectric material or a magnetic material on at least a portion of the magnetic field antenna, and the secondary resonance point does not overlap the second usable frequency band.

4. The portable wireless device according to claim 3, wherein the dielectric material comprises any one of a resin, a sponge and a plastic, or a combination thereof.

5. The portable wireless device according to claim 1, wherein the first antenna unit is a magnetic field antenna, and the portable wireless device is configured such that the secondary resonance point does not overlap the second usable frequency band by connecting a capacitor to the magnetic field antenna.

6. The portable wireless device according to claim 1, wherein the first antenna unit is a plurality of magnetic field antennae, and the portable wireless device is configured such that the secondary resonance point does not overlap the second usable frequency band by connecting a capacitor to each of the magnetic field antennae.

7. The portable wireless device according to claim 5, wherein the first antenna unit is disposed so that at least a portion thereof faces the second antenna unit in a predetermined direction, and the capacitor is connected to a portion, facing the second antenna unit, of the first antenna unit.

8. The portable wireless device according to claim 1, wherein the first communication unit is a contactless IC (Integrated Circuit) chip that communicates with an external device using electromagnetic induction or electromagnetic coupling.

9. A portable wireless device comprising:

a body;

a first communication unit that includes a first antenna unit disposed in the body that communicates with an external device by way of a first usable frequency band, and a first information processing unit that performs predetermined processing with respect to information communicated by the first antenna unit; and a second communication unit that includes a second antenna unit disposed in the body, in a position where the second antenna may cause interference to the first antenna unit, which communicates by way of a second usable frequency band that is higher than the first usable frequency band, and a second information processing unit that performs predetermined processing with respect to information communicated by the second antenna unit, wherein a high-order secondary resonance point of the first usable frequency band generated due to resonance of the first antenna unit is adjusted not to overlap the second usable frequency band by adjusting a reactance component of the first antenna unit.

10. The portable wireless device according to claim 1 or 9, comprising:

a third communication unit that includes a third antenna unit which is disposed in the vicinity of the first antenna unit, which communicates by way of a third usable frequency band that is higher than the first usable frequency band, and a third information processing unit which performs predetermined processing with respect to information communicated by the third antenna unit; and a control unit that controls any one of the second communication unit and the third communication unit, makes an adjustment: so that a high-order secondary resonance point of the first usable frequency band does not overlap the second usable frequency band in a case where the control unit controls the second communication unit; and makes an adjustment so that the high-order secondary resonance point of the first usable frequency band does not overlap the third usable frequency band in a case where the control unit controls the third communication unit.

* * * * *